April 11, 1933.   K. MARTIN   1,903,593
EYEGLASSES
Filed Nov. 27, 1928

Inventor
Karl Martin
By Knight Bro
attys

Patented Apr. 11, 1933

1,903,593

UNITED STATES PATENT OFFICE

KARL MARTIN, OF RATHENOW, GERMANY

EYEGLASSES

Application filed November 27, 1928, Serial No. 322,259, and in Germany March 24, 1928.

The present invention relates to improved bifocal eyeglasses that are composed of a distance portion and a reading portion the optical axes of which two portions coincide. The improved construction allows of the eyeglasses of this type to be easily produced by wholesale manufacture with an absolutely uniform result and consists in the fact that the distance portion is formed by one sole blank and that both said portions are united with one another by welding or fusing. In manufacturing my improved eyeglasses I proceed as follows:

The reading portion is constituted by a prepared glass body having something of the shape of part of a lens which is optically worked on the places to be welded, whilst the distance portion consists of one sole piece the material of which has a lower softening or melting point than that of the reading portion. Consequently, the distance portion when softened by heating is enabled to lower towards the reading portion and can be pressed on it, whereupon the whole system in known manner is ground to finished state. Owing to the fact that I give to the nearly semicircular additional lens which forms the reading portion the same optical axis as to the distance portion, the whole system is centered, so that no image jump can occur when the eye passes from the upper distance portion to the reading portion. I further attain by the described method of manufacture the advantage that no air or glass bubbles can remain between the two surfaces to be welded together, the presence of which bubbles would render useless the eyeglass.

The two sorts of glass the described bifocal eyeglass is made of, advantageously are so chosen in a well known manner that the combination is free from disturbing colored margins, that means, is achromatic.

Figure 1:
Figure 2:
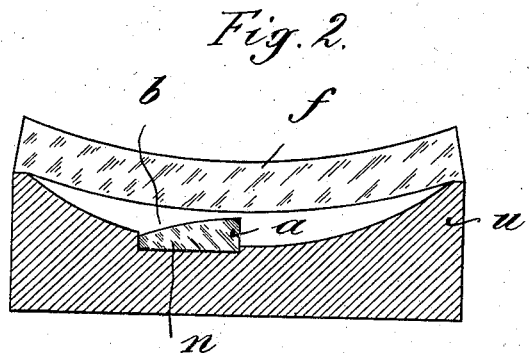
Figure 3:

In order to allow of my invention to be more easily understood, the specification is accompanied by a drawing in which Figure 1 shows the finished bifocal glass in section, Figure 2 is a section through the pressing die with the two glass portions in place, while Figure 3 shows the rough system previous to being ground.

As to be seen from Figure 2, I use a die or base plate $n$ in a corresponding recess of which the reading portion $a$ is embedded while the distance portion $f$ is put thereon. When heated in a suitable furnace the distance portion lowers owing to its lower softening point, so that the reading portion $n$ penetrates therein with its prepared faces $a, b$, to which end a slight pressure may be applied still on portion $f$. After the pressing operation the two glass portions possess the rough shape to be seen from Figure 3, and the system is then finished by grinding.

It may be noted that the connecting surfaces of the two glass portions need not to be spherical ones under all circumstances, in the contrary, it will be convenient in certain cases to prefer aspherical connecting surfaces the curvature of which flattens toward the edge of the eyeglass. This results in the advantage of the passage from the reading portion to the distance portion becoming milder, this being taken very agreeably in particular in going upstairs or downstairs.

What I claim and desire to secure by Letters Patent, is:—

The process for the manufacture of a multiple focus lens consisting of a distance portion and a reading portion formed of a fractional part of a lens having a spherically-shaped surface and a plane lateral surface, which comprises preparing only the spherically-shaped and lateral surfaces of said reading portion, formed of a fractional part of a lens, which are designed to be joined to the distance portion, heating the non-recessed distance portion to a point above the softening point thereof and below the softening point of said reading portion, superimposing the spherically-shaped surface of said reading portion with said distance portion in its heated condition, joining said distance portion of the spherically-shaped and lateral surfaces of said reading portion by applying a pressure to the former in addition to normally existing pressures without affecting the prepared surfaces upon said reading portion, and finishing the composite lens thus formed.

In testimony whereof I affix my signature.

KARL MARTIN.